United States Patent
Nishikawa

(10) Patent No.: US 7,559,214 B2
(45) Date of Patent: Jul. 14, 2009

(54) METHOD OF MANUFACTURING OPTICAL ELEMENT MADE OF GLASS

(75) Inventor: Shinichi Nishikawa, Ibaraki (JP)

(73) Assignee: Minolta Co., Ltd., Osaka (JP)

( * ) Notice: Subject to any disclaimer, the term of this patent is extended or adjusted under 35 U.S.C. 154(b) by 387 days.

(21) Appl. No.: 10/624,331

(22) Filed: Jul. 22, 2003

(65) Prior Publication Data
US 2004/0231362 A1    Nov. 25, 2004

(30) Foreign Application Priority Data
May 19, 2003    (JP)    ............................. 2003-141005

(51) Int. Cl.
C03B 11/00    (2006.01)
(52) U.S. Cl. ......................................................... 65/66
(58) Field of Classification Search .................. 65/66, 65/126, 127
See application file for complete search history.

(56) References Cited

U.S. PATENT DOCUMENTS

| | | | |
|---|---|---|---|
| 3,833,347 A | 9/1974 | Angle et al. | 65/32 |
| 3,900,328 A | 8/1975 | Parsons et al. | 106/39.5 |
| 4,734,118 A | 3/1988 | Marechal et al. | 65/102 |
| 5,738,701 A * | 4/1998 | Ikeuchi et al. | 65/29.12 |
| 6,288,849 B1 * | 9/2001 | Teramoto | 359/720 |
| 2002/0053223 A1 | 5/2002 | Nishikawa | 65/377 |

FOREIGN PATENT DOCUMENTS

| | | | |
|---|---|---|---|
| JP | 60-171231 A | | 9/1985 |
| JP | 04-016414 B2 | | 12/1989 |
| JP | 03-237023 A | | 10/1991 |
| JP | 08-133764 A | | 5/1996 |
| JP | 2003146673 A | * | 5/2003 |

* cited by examiner

*Primary Examiner*—Steven P Griffin
*Assistant Examiner*—Queenie Dehghan
(74) *Attorney, Agent, or Firm*—Sidley Austin LLP

(57) ABSTRACT

An optical element manufacturing method has a preparation step of preparing a lower mold and an upper mold. The lower mold has an outer shape restricting surface for the optical element. A reference surface formation step of forms a positioning reference surface on a rim of the optical element by heating the outer shape restricting surface of the lower mold and dropping molten glass onto the lower mold surface so as to collide with the lower mold surface and spread to be in contact with the outer shape restricting surface. A pressing step forms the two opposed optical function surfaces of the optical element by pressing the glass. A temperature of the outer shape restricting surface in the reference surface formation step and the pressing step is higher than a temperature which is 100° C. less than a glass transition temperature (° C.) of the glass.

8 Claims, 4 Drawing Sheets

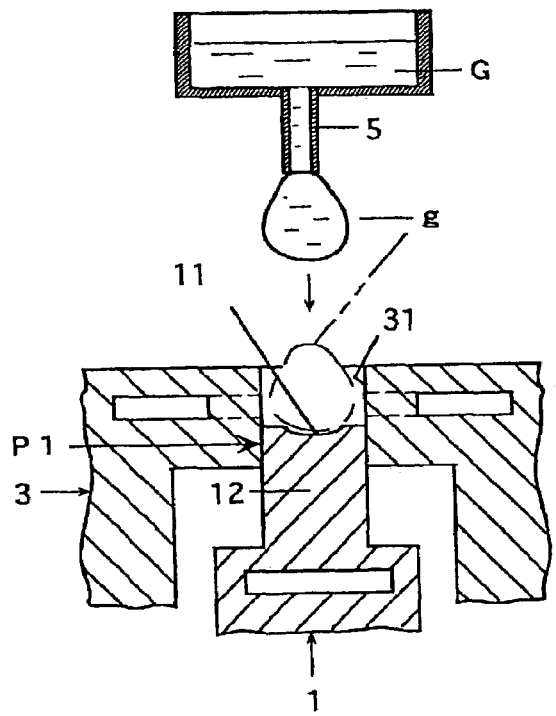
*FIG. 3(A)*
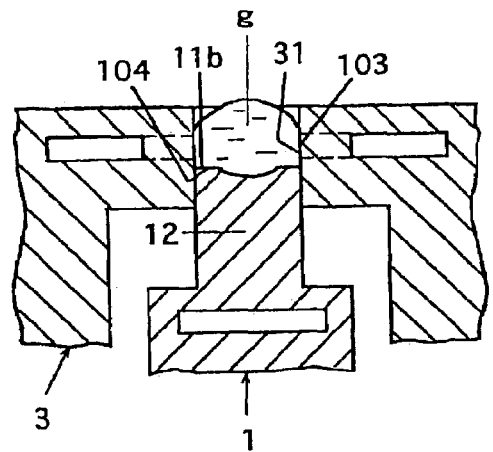
*FIG. 3(B)*
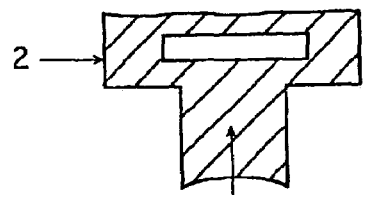
*FIG. 3(D)*
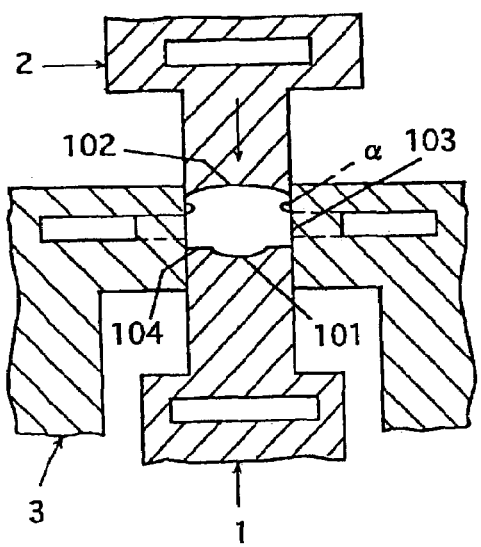
*FIG. 3(C)*
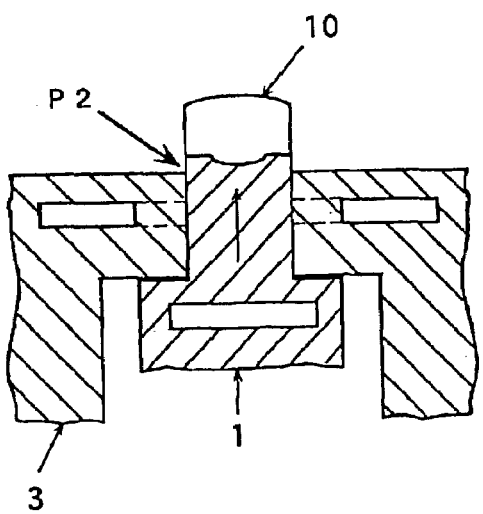

METHOD OF MANUFACTURING OPTICAL ELEMENT MADE OF GLASS

RELATED APPLICATION

This application is based on application No. 2003-141005 filed in Japan on May 19, 2003, the content of which is hereby incorporated by reference.

FIELD OF THE INVENTION

The present invention relates to a method of manufacturing an optical element made of glass such as a glass lens element.

DESCRIPTION OF THE PRIOR ART

Today, optical elements made of glass are widely used as lens elements for digital cameras, optical pickup lens elements, camera lens elements for mobile telephones, coupling lens elements for optical communication, and input and output elements for optical fibers for reasons such that compared to optical elements made of plastic, they can be precisely attached to members such as lens barrels because of being small in thermal expansion coefficient, can be made high-performance elements because of being high in refractive index and are excellent in thermal stability, and their optical function surfaces such as lens surfaces are easily formed with high precision by molding.

To form such glass optical elements, the following steps are typically performed:

(1) a glass material for molding having a predetermined weight and configuration is prepared;

(2) the glass material and a metal mold are heated to a temperature at which glass is deformable;

(3) the glass material is pressed with the metal mold to form an optical function surface of an optical element to be obtained;

(4) the molded optical element and the metal mold are cooled to the neighborhood of room temperature; and (5) then, the optical element is taken out of the metal mold (see U.S. Pat. Nos. 3,900,328 and 3,833,347).

However, according to this method, it is difficult to reduce the cost of optical elements because the step of preparing the glass material for molding having a predetermined weight and configuration with high precision is indispensable and the steps of heating and cooling the glass material and the metal mold require a long time. In particular, to manufacture a lens element having a positioning reference surface on its rim and requiring no centering and edging step of making the lens outer diameter constant, it is necessary to strictly control the weight of the glass material, which requires a high cost.

With regard to this, Japanese Laid-Open Patent Application No. S60-171231 proposes to omit the centering and edging step by forming, in lens molding, a part of the lens structure material into an annular or protruding shape on a part of an outer region situated outside the effective diameter and on the side of the lens principal surface so that variations among glass materials for molding are absorbed by the annular or protruding part, and setting the precision of the lens outer shape to a predetermined one.

Japanese Laid-Open Patent Application No. H03-237023 proposes to form a lens element requiring no centering and edging step and held in a lens holder by disposing the glass material for molding in a hole of the lens holder and molding it.

However, according to the optical element manufacturing method requiring no centering and edging step described in these patent applications, although the permissible range of the weight of the glass material for molding increases to some extent, not only high-precision machining is still necessary for forming the glass material but also no solution is shown to the other significant problem that the steps of heating and cooling the glass material and the metal mold require a long time.

Thereafter, an optical element manufacturing method completely different from these methods was proposed. That is, Japanese Examined Patent Publication No. H04-16414 discloses a method such that a predetermined amount of molten glass is dropped from the tip of a nozzle onto a mold and an optical element is formed with the mold while the dropped glass is still at a temperature at which it is deformable.

According to this method, since molten glass freely dropped from the tip of a nozzle is used, an expensive glass material for molding is unnecessary and the steps of heating the glass material and the mold from room temperature and cooling them after molding are unnecessary, so that the optical element manufacturing time is significantly reduced. By these, the optical element manufacturing cost is much lower than that required when the methods forming optical elements by heating and cooling the glass material for molding together with the metal mold are used, so that the productivity of optical elements is increased.

Japanese Laid-Open Patent Application No. H08-133764 discloses a method of manufacturing, by applying such an improved method, a lens element having a positioning reference surface and requiring no centering and edging step. According to this method, in forming a lens element with a mold, a reference surface parallel to the optical axis and a reference surface vertical to the optical axis are formed on the lens effective diameter rim.

While according to the molding method disclosed in Japanese Examined Patent Publication No. H04-16414, it is difficult that the molten glass drop freely dropped from a nozzle is as minute as not more than 100 mg in weight, the Publication of U.S. Patent. Application No. 2002-0053223 A1 discloses to obtain a minute glass drop by disposing a drop amount adjustment member having a thin through hole formed therein on a path along which molten glass is dropped from a nozzle, and causing the glass drop to collide with the drop amount adjustment member so that at least part of the glass drop is pushed out of the thin hole of the adjustment member as a minute drop.

As described above, the optical element manufacturing methods by molding a molten glass drop disclosed in Japanese Examined Patent Publication No. H04-16414, etc. produce advantages that the optical element manufacturing cost is low and that the productivity is high and the method of the Publication of U.S. Patent Application No. 2002-0053223 A1 produces an advantage that it can be used for manufacturing small-size optical elements. However, these patent applications disclose no method of forming a positioning reference surface on the rim of an optical element.

For attachment to a member such as a lens barrel, it is necessary for an optical element to have a positioning reference surface abutting on a reference portion preprovided on the member such as a lens barrel in order that the position of the optical element on the member and the position and the orientation of the optical axis of the optical element are predetermined ones, and at that time, it is sometimes required that the reference surface be present on the rim (edge) of the optical element (for example, a lens element).

Japanese Laid-Open Patent Application No. H08-133764 discloses the formation of a positioning reference surface as mentioned above. However, according to this method, it is impossible to restrict the lens rim (edge) although this method is effective when the positioning reference surface is provided inside the lens rim. In addition, the edge surface is left as a free surface and this makes lens size reduction difficult.

SUMMARY OF THE INVENTION

Accordingly, an object of the present invention is to provide an optical element manufacturing method capable of manufacturing an optical element having a positioning reference surface on its rim at low cost and with high productivity and of handling size reduction of optical elements.

In view of the above, the present invention provides an optical element manufacturing method comprising:

a step of preparing a lower mold having a lower mold surface for forming an optical unction surface of an optical element to be manufactured and an upper mold having an upper mold surface for forming another optical function surface of the optical element, said lower mold having an outer shape restricting surface for the optical element or being combined with a member having the outer shape restricting surface, said upper mold being opposed to the lower mold;

a reference surface formation step of forming a positioning reference surface on a rim of the optical element by heating the outer shape restricting surface of the lower mold or combined with the lower mold and the lower mold surface and dropping molten glass onto the lower mold surface so as to collide with the lower mold surface and spread to be in contact with the outer shape restricting surface;

a pressing step of forming the two opposed optical function surfaces of the optical element by, after the formation of the reference surface, opposing the lower mold and the upper mold that is heated and bringing them relatively close to each other while the glass is still at a temperature at which it is deformable by pressing, and pressing the glass; and an element taking out step of, after the pressing step, releasing the glass from the pressing by the upper and the lower molds and taking out the molded optical element, wherein a temperature of the outer shape restricting surface in the reference surface formation step and the pressing step is higher than a temperature which is a difference when 100° C. is subtracted from a glass transition temperature (° C.) of the glass.

The present invention has the following characteristics:

First, by adopting a method basically similar to the optical element manufacturing method by molding a molten glass drop disclosed in Japanese Laid-Open Patent Application No. H04-16414, it is unnecessary to prepare a glass material for molding like the conventional methods and it is also unnecessary to heat and cool such a glass material and the metal mold, so that an optical element can be manufactured at low cost and with high productivity.

As for the positioning reference surface on the rim of the optical element, a lower mold having an outer shape restricting surface for the optical element to be manufactured is used and glass is dropped onto the lower mold so as to collide with the lower mold and spread to be in contact with the outer shape restricting surface, whereby the positioning reference surface on the rim of the optical element can be formed. Moreover, by adopting such a reference surface forming method, a stable positioning reference surface can be formed under a condition where it is hardly affected by the condition of the pressing of the entire optical element performed thereafter.

While the dropped molten glass is cooled mainly by heat radiation from a contact surface between the lower mold and the outer shape restricting surface, by the temperature of the outer shape restricting surface being higher than a temperature which is the difference when 100° C. is subtracted from the glass transition temperature (° C.) of the glass drop, the decrease of the temperature of the part of the glass drop that is in contact with the outer shape restricting surface for heat radiation can be suppressed, so that damages such as fractures and chips in the part at the time of pressing can be suppressed. As a result, an excellent optical element can be obtained Moreover, by molding an optical element by use of a lower mold having such an outer shape restricting surface, the position of the part of the glass drop corresponding to the rim of the optical element is restricted by the outer shape restricting surface, so that an edge that is formed in a free condition without being restricted like that in the case of the method disclosed in Japanese Laid-Open Patent Application No. H08-133764 is never caused and a small-size optical element can be manufactured accordingly.

BRIEF DESCRIPTION OF THE DRAWINGS

This and other objects and features of this invention will become clear from the following description, taken in conjunction with the preferred embodiments with reference to the accompanied drawings in which:

FIGS. 3(A) to 3(D) are views showing the process of manufacturing the lens element shown in FIG. 1;

DESCRIPTION OF THE PREFERRED EMBODIMENT

Figure 1:
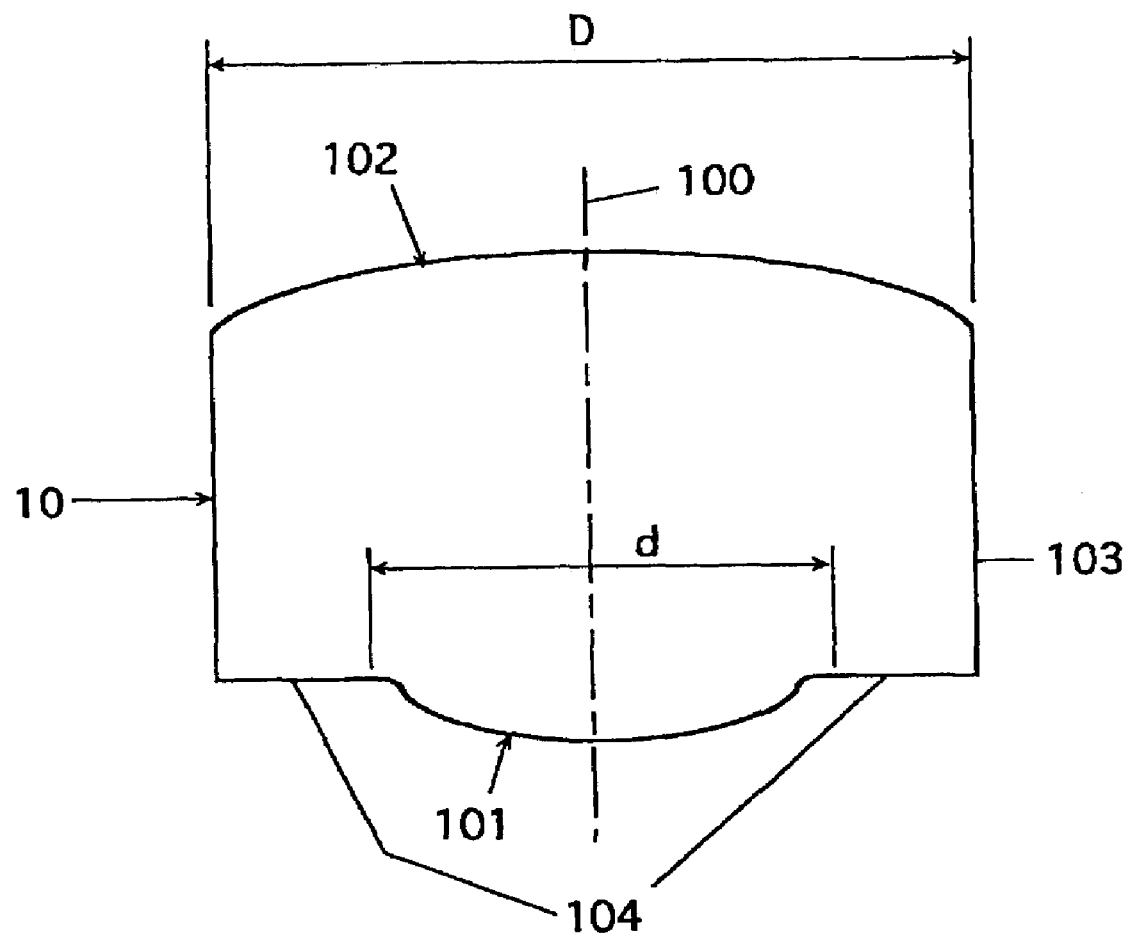
FIG. 1 is a cross-sectional view of an example of a lens element to be manufactured.

An optical element manufacturing method according to an embodiment of the present invention basically includes the following steps:

(1) a preparation step of preparing: a lower mold having an outer shape restricting surface for an optical element to be manufactured or being combined with a member having the outer shape restricting surface, and having a lower mold surface for forming a first optical function surface of the optical element; and an upper mold disposed so as to be opposed to the lower mold and having an upper mold surface for forming a second optical function surface of the optical element;

(2) a reference surface formation step of forming a positioning reference surface on the rim of the optical element by heating each of the outer shape restricting surface of the lower mold or combined with the lower mold and the lower mold surface to a predetermined temperature and dropping a predetermined amount (an amount with which the optical element can be obtained) of molten glass onto the lower mold surface so as to collide with the lower mold surface and spread to be in contact with the outer shape restricting surface;

(3) a pressing step of forming the two opposed optical function surfaces of the optical element by, after the formation of the reference surface, opposing the lower mold and the upper mold that is heated to a predetermined temperature and bringing them relatively close to each other while the glass is still at a temperature at which it is deformable by pressing, and pressing the glass; and (4) an element taking out step of, after the pressing step, releasing the glass from the pressing by the upper mold and the lower mold and taking out the molded optical element.

The temperature of the outer shape restricting surface in the reference surface formation step and the pressing step is higher than a temperature (Tg−100° C.) which is the difference when 100° C. is subtracted from the glass transition temperature [Tg (° C.)] of the glass.

According to this optical element manufacturing method, since it is unnecessary to prepare a glass material for molding like the conventional methods and it is also unnecessary to heat and cool the glass material together with the metal mold, an optical element having a positioning reference surface on its rim can be manufactured at low cost and with high productivity.

Since the positioning reference surface on the rim of the optical element which is formed when molten glass is dropped is hardly affected by the pressing condition in the pressing step performed thereafter, even when there are changes or variations in the pressing condition, a stable positioning reference surface can be formed.

While the dropped molten glass is cooled mainly by heat radiation from a contact surface between the lower mold and the outer shape restricting surface, since the glass is pressed by bringing the lower mold and the upper mold that is heated to the predetermined temperature close to each other while the glass is still at the temperature at which it is deformable by pressing after the formation of the reference surface, an optical element can be formed having a desired thickness and two opposed optical function surfaces.

Moreover, since an optical element is molded by use of a lower mold having such an outer shape restricting surface, the position of the part of the glass drop corresponding to the rim of the optical element is restricted by the outer shape restricting surface, so that an edge that is formed in a free condition without being restricted like that in the case of the method disclosed in Japanese Laid-Open Patent Application No. H08-133764 is never caused and a small-size optical element can be manufactured accordingly.

The temperature of the lower mold, particularly the temperature of the lower mold surface, in the reference surface formation step and the pressing step may be a temperature in a range where the desired optical element can be formed. However, it is undesirable that the temperature be higher than necessary from the viewpoint of preventing the glass and the lower mold surface from being fused with each other and from the viewpoint of the life of the lower mold. On the other hand, it is necessary that the configuration of the lower mold surface, particularly the configuration of a region (optical effective surface region) of the lower mold surface for forming the effective diameter region of the optical function surface of the optical element be transferred to the glass with high precision. From these viewpoints, it is desirable that the temperature of the lower mold surface be the glass transition temperature or substantially the glass transition temperature (hereinafter, sometimes generically referred to as "substantial glass transition temperature"), or be a temperature in a range of (glass transition temperature−50° C.) to (glass transition temperature+100° C.).

It is desirable that the temperature of the upper mold, particularly the upper mold surface for forming the optical function surface in the pressing step, be also the substantial glass transition temperature or be a temperature in a range of (glass transition temperature−50° C.) to (glass transition temperature+100° C.) for similar reasons to those in the case of the lower mold surface.

As mentioned above, the dropped molten glass is cooled by heat radiation from the contact surface between the lower mold and the outer shape restricting surface. At this time, if the temperature of the outer shape restricting surface is too low, radiation of the heat of the glass from the contact surface with the outer shape restricting surface is quick and this makes too large the temperature difference between the inside of the glass and the neighborhood of the contact surface with the outer shape restricting surface, so that the temperature of the rim of the glass is already lower than the glass deformable temperature in the pressing step. As a result, fractures and chips are caused in the rim.

However, according to this method, since the temperature of the outer shape restricting surface is higher than the temperature which is the difference when 100° C. is subtracted from the glass transition temperature (° C.) of the glass drop in the reference surface formation step and the pressing step as mentioned above, the decrease of the temperature of the part of the glass drop that is in contact with the outer shape restricting surface for heat radiation can be suppressed, so that damages such as fractures and chips in the part at the time of pressing can be suppressed and an excellent optical element can be obtained accordingly.

It is desirable that the temperature of the outer shape restricting surface in the reference surface formation step and the pressing step be high in the viewpoint of suppressing fractures and chips in the rim of the glass.

On the other hand, from the viewpoint of the life of the mold and the like, as mentioned above, it is undesirable that the temperature of the lower mold surface be higher than the temperature necessary for transferring the configuration of the optical effective surface region to the glass with high precision.

For this reason, examples of the temperature of the outer shape restricting surface include a temperature the same as or higher than the temperature of the lower mold surface [a temperature in a range of (glass transition temperature−50° C.) to (glass transition temperature +100° C.)].

In any case, the reference surface formation step, the pressing step and the element taking out step can be performed while the target set temperatures are maintained constant in the temperature control for heating the outer shape restricting surface, the lower mold surface and the upper mold surface (for obtaining the predetermined temperatures) in the reference surface formation step and the pressing step. By doing this, the manufacturing time per optical element can be significantly reduced.

Here, "while the target set temperatures are maintained constant in the temperature control" does not mean preventing the temperatures of the lower mold surface and the like from varying by a contact with the glass while the steps are performed, and such temperature variations are permitted.

In recent years, as optical elements having a positioning reference surface, ones of non-circular shapes such as squares and rectangles are required as well as ones being circular in the cross section vertical to the optical axis thereof. To manufacture such non-circular optical elements by the conventional element manufacturing methods, expensive glass materials for molding precisely processed according to the shapes of the optical elements are necessary, which makes the element manufacturing cost extremely high. However, by using the method described here, such non-circular optical elements can be inexpensively manufactured with excellent productivity.

That is, optical elements in which the cross section, vertical to the optical axis thereof, of the positioning reference surface on the rim thereof is non-circular can be manufactured so that the outer shape restricting surface is the surface where the positioning reference surface is formed.

In any case, as the lower mold, one is adopted in which a restricting surface for forming a second positioning reference surface of the optical element is formed in a region of the lower mold surface which region is outside the effective diameter surface where the effective diameter region of the optical function surface of the optical element to be manufactured is formed, and in the reference surface formation step, the second positioning reference surface may be formed simultaneously with the positioning reference surface on the rim of the optical element.

Such a second positioning reference surface (accordingly, a restricting surface for forming this) may have various configurations as required such as a surface vertical to the optical axis of the optical element, a tapered surface inclined from the direction vertical to the optical axis and a stepped surface.

Moreover, in dropping the molten glass in the reference surface formation step, the following may be performed: a drop amount adjustment member having a thin through hole formed therein is disposed on the dropping path and the glass drop is caused to collide with the drop amount adjustment member so that at least part of the glass drop is pushed out of the thin hole of the adjustment member as a minute drop and drops onto the lower mold surface. By doing this minute optical elements can be manufactured.

Hereinafter, some examples of optical element manufacturing will be described with reference to the drawings.

Figure 2:
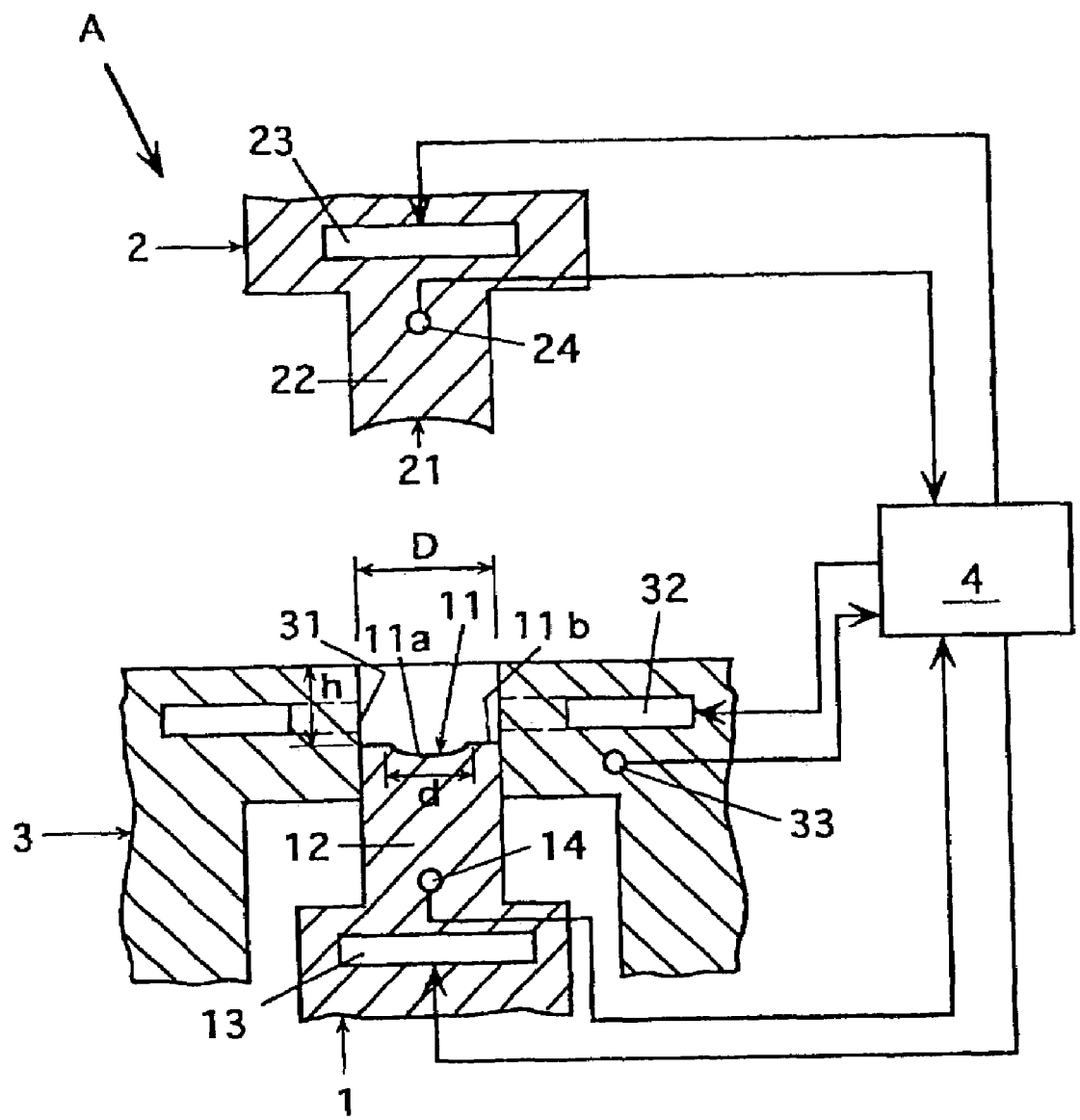
FIG. 2 is a cross-sectional view of an upper mold, a lower mold and an outer shape restricting member used for manufacturing the lens element.

FIG. 1 is a cross-sectional view of a glass lens element 10 (an example of the optical element) to be manufactured. FIG. 2 is a cross-sectional view of an example A of the metal mold used for manufacturing the lens element 10. FIGS. 3(A) to 3(D) show the process of manufacturing the lens element 10.

The glass lens element 10 to be manufactured shown in FIG. 1 has two opposed optical function surfaces 101 and 102, has a positioning reference surface 103 parallel to the lens optical axis 100 on the rim (edge), and has a positioning reference surface 104 vertical to the lens optical axis 100 in an outer region of the optical function surface 101.

The metal mold A shown in FIG. 2 has a lower mold 1 and an upper mold 2. An outer shape restricting member 3 having a cylindrical outer shape restricting surface 31 as its inner surface is combined with the lower mold 1.

The lower mold 1 has a lower mold surface 11 for forming the first optical function surface 101 of the lens element 10. The lower mold surface 11 faces upward and is circular when viewed from a plane. The central part of the lower mold surface 11 is concave, and the concave part and a flat circular part ranging therefrom provide an effective diameter surface 11a forming the region of the effective diameter d of the optical function surface 101. A restricting surface 11b for forming the positioning reference surface 104 vertical to the optical axis of the lens element 10 is formed in the region outside the effective diameter surface.

An upper portion 12 of the lower mold 1 including the lower mold surface 11 is slidably fitted in the outer shape restricting member 3 placed in position. The lower mold 1 is capable of being ascended and descended by a non-illustrated ascent/descent driver, and this enables the upper portion 12 to be ascended and descended along the outer shape restricting surface 31 of the member 3 and be set in a position P1 (see FIG. 3(A)), for lens molding, surrounded by the outer shape restricting surface 31 and in a position P2 (see FIG. 3(D)), for taking out the molded lens element, protruding out of the member 3.

The upper mold 2 comprises a concave surface facing downward and for forming the second optical function surface 102 of the lens element 10, and has an upper mold surface 21 being circular when viewed from below. The upper mold 2 is capable of being ascended and descended by a non-illustrated ascent/descent driver, and this enables a lower part 22 including the upper mold surface 21 to move into and out of the space surrounded by the cylindrical outer shape restricting member 31.

The lower mold 1 incorporates an electric heater 13 for heating the lower mold surface 11. The upper mold 2 incorporates an electric heater 23 for beating the upper mold surface 21. The outer shape adjustment member 3 incorporates an electric heater 32 for heating the outer shape adjustment surface 31. These heaters 13, 23 and 32 are controlled based on detected temperature information from temperature sensors 14, 24 and 33 provided on the lower mold 1, the upper mold 2 and the member 3, respectively, by use of a temperature adjuster 4, and heat the lower mold surface 11, the upper mold surface 21 and the outer shape restricting surface 31 to target temperatures set for the surfaces 11, 21 and 31, respectively.

The target set temperatures for the lower mold surface 11 and the upper mold surface 21 in the temperature control by the temperature adjuster 4 are approximately the glass transition temperature Tg of the glass drop mentioned later or temperatures in a range of (Tg−50° C.) to (Tg+100° C.). The target set temperature for the outer shape restricting surface 31 is higher than (Tg−100° C.), for example, the same as the target set temperature for the lower mold surface 11.

Next, the manufacturing of the glass lens element 10 using the metal mold A will be described with reference to FIGS. 3(A) to 3(B).

First, as shown in FIG. 3(A), the lower mold upper portion 12 is placed in the lens molding position P1 surrounded by the outer shape restricting surface 31, and a nozzle 5 from which molten glass G is dropped is situated above the center of the lower mold surface 11 of the lower mold 1 and a predetermined amount of molten glass G melted in a non-illustrated melting pot is freely dropped from the nozzle 5 onto the lower mold surface 11.

At this time, prior to the dropping of the molten glass G the lower mold surface 11 is heated by the heater 13 approximately to the glass transition temperature Tg of the glass drop G or a temperature in a range of (Tg−50° C.) to (Tg+100° C.), and the outer shape restricting surface 31 is heated by the heater 32 to a temperature higher than (Tg−100° C.), for example, a temperature similar to the temperature of the lower mold surface 11. After the dropping of the glass, the nozzle 5 is retracted to a position where it does not hinder the ascent and descent of the upper mold 2.

According to such a glass supplying method by free dropping from the nozzle 5, variations among the amount of glass dropped for obtaining the lens element 10 can be restrained to a range of ±1 mm, so that a lens element with high precision can be obtained accordingly.

When a predetermined amount of molten glass G is dropped from the nozzle 5 onto the lower mold surface 11, as shown in FIG. 3(B), the molten glass drop g collides with the lower mold surface 11 and spreads to be in contact with the outer shape restricting surface 31. By doing this, the positioning reference surface 103 on the rim of the lens element 10 can be formed with high precision. At the same time, the positioning reference surface 104 is also formed with high precision by the restricting surface 11b on the lower mold surface 11.

After the reference surfaces are formed, as shown in FIG. 3(c), the upper mold 2 previously heated to a temperature similar to the temperature of the lower mold 1 is descended into the space surrounded by the outer shape restricting surface 31 while the glass g is still at a temperature at which it is deformable by pressing, and the glass g is pressed between the lower mold 1 and the upper mold 2 to thereby form the opposed optical function surfaces 101 and 102 of the lens element 10 and form the lens element 10 with the thickness of the glass g as the thickness of the lens element 10.

At this time, there can be cases where the part of the glass g that is out of contact with the outer shape restricting surface 31 when the glass g is dropped is also out of contact with the outer shape restricting surface 31 at the time of pressing and is left as a concave α or the like on the rim of the glass as shown in FIG. 3(c). However, such a part never damages the function of the positioning reference surface 103 because it never extends beyond the positioning reference surface 103.

Thereafter, as shown in FIG. 3(D), the upper mold 2 is ascended, the lower mold 1 is descended, and the glass lens element 10 having the positioning reference surfaces 103 and 104 are taken out of the metal mold.

Figure 4:
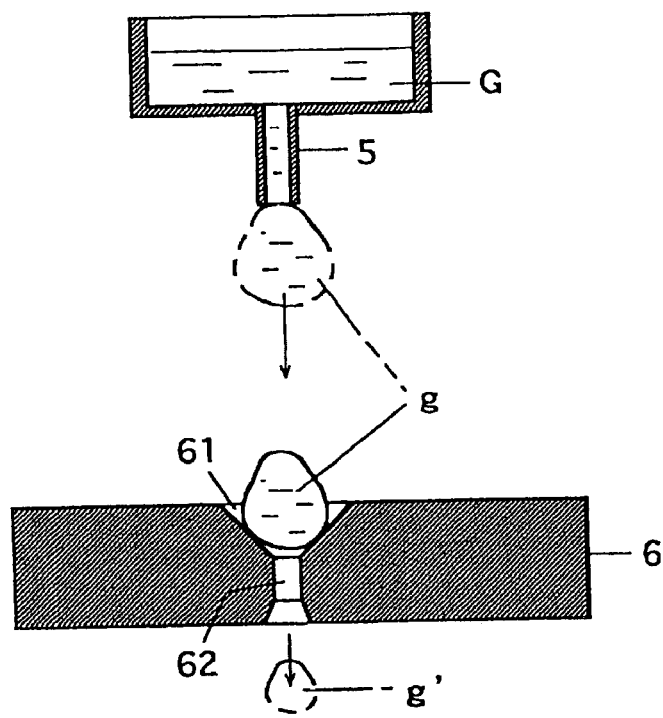
FIG. 4 is a view showing an example using a glass drop amount adjustment member.

The above-described lens manufacturing process can be repetitively performed while the target set temperatures of the lower mold surface 11, the upper mold surface 21 and the outer shape restricting surface 31 in the temperature control by the temperature adjuster 4 are held constant, whereby the lens element 10 can be manufactured with efficiency By the dropping of the glass by free dropping from the nozzle 5, it is usually difficult to drop a glass drop not more than 100 mg in weight. Therefore, when a small-size glass lens element is formed with a small glass drop, the following may be performed: as shown in FIG. 4, in dropping the molten glass g, a drop amount adjustment member 6 in which a thin through hole 62 connecting with a tapered hole 61 becoming wider upward is formed is disposed on the dropping path, and the glass drop g is dropped so as to collide with the member 6 so that at least part of the glass drop is pushed out of the thin hole 62 as a minute drop g' and drops onto the lower mold 1.

Figure 5A:
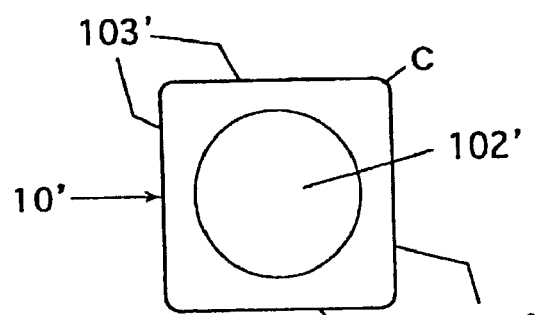
FIGS. 5(A) and 5(B) are a plan view and a side view of another example of the lens element to be manufactured.
Figure 5B:
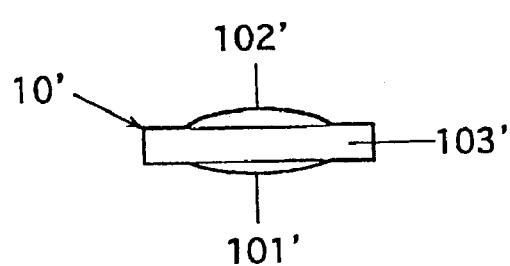

FIGS. 5(A) and 5(B) are a plan view and a side view of another example 10' of the glass lens element to be manufactured. The lens element 10' is a square lens element where the angular portions C are rounded when viewed from a plane. The lens element 10' has two opposed optical function surfaces 101' and 102', and has a positioning reference surface 103' on its rim.

Such a non-circular lens element 10' can be easily formed with high precision like the lens element 10 by the lower mold surface 11 of the lower mold 11 being a surface capable of forming the optical function surface 101', the outer shape restricting surface 31 of the outer shape restricting member 3 being a surface capable of forming the positioning reference surface 103' and the roundness of the lens angular parts C, and the upper mold surface 21 of the upper mold 2 being a surface capable of forming the optical function surface 102'.

Next, experimental examples of the lens manufacturing will be described.

In the experimental examples shown below, the glass dropping was performed under the following conditions and a metal mold of the type shown in FIG. 2 was used:

Glass material used: a phosphatic glass

Glass transition temperature Tg: 432° C.

The glass was melted at 1100° C., and with the nozzle temperature being 900° C., the glass was dropped, by use of a drop amount adjustment member having the structure shown in FIG. 4, onto the lower mold surface for a distance of 5 mm from the drop amount adjustment member.

FIRST EXPERIMENTAL EXAMPLE

Lens element to be manufactured: a circular lens element of the type shown in FIG. 1

Outer diameter D=1.7 mm

Glass drop amount: 10 mg

Lower mold: having a surface region (in a range of 1.1 mm to 1.7 mm in diameter) for forming the positioning reference surface vertical to the optical axis in an outer region of the lower mold surface; 1.1 mm coincides with the effective diameter d of the lens optical function surface, and 1.7 mm coincides with the lens outer diameter D.

Outer shape restricting surface of the outer shape restricting member: height h from the lower mold surface=1.2 mm inner diameter D=1.7 mm Target set temperatures of the lower mold and the upper mold (the lower mold surface and the upper mold surface): 450° C.

Target set temperature of the outer shape restricting surface: 450° C.

The target set temperatures were maintained constant from the dropping of the glass to the taking out of the lens element.

By the dropping of the glass onto the lower mold surface, a positioning reference surface, parallel to the optical axis, with a height of 0.5 mm was formed by the outer shape restricting surface, and a positioning reference surface vertical to the optical axis was formed by the lower mold surface.

Then, the glass was pressed with the upper and the lower molds while it was at a temperature at which it is deformable (three seconds after the dropping).

A glass lens element having two positioning reference surfaces similar to that shown in FIG. 1 was obtained.

A total of ten glass lens elements including the one mentioned above were formed by repeating the steps of glass dropping, pressing and lens taking out while maintaining constant the control temperatures (target set temperatures) of the upper and the lower molds and the outer shape restricting member, and no fracture or chip was caused in these lens elements.

SECOND EXPERIMENTAL EXAMPLE

Lens element to be manufactured: a non-circular lens element of the type shown in FIGS. 5(A) and 5(B)

Size of the lens element when viewed from a plane:

a square with sides of 3.5 mm angle R=0.5 mm

Glass drop amount: 50 mg

Outer shape restricting surface of the outer shape restricting member: height from the lower mold surface=2 mm the size when viewed from a plane is the same as that of the lens element Target set temperatures of the lower mold and the upper mold (the lower mold surface and the upper mold surface): 470° C.

Target set temperature of the outer shape restricting surface: 500° C.

The target set temperatures were maintained constant from the dropping of the glass to the taking out of the lens element.

By the dropping of the glass onto the lower mold surface, a positioning reference surface, parallel to the optical axis, with a height of 0.6 mm was formed on the four surfaces on the rim of the lens element by the outer shape restricting surface.

Then, the glass was pressed with the upper and the lower molds while it is at a temperature where it is deformable (five seconds after the dropping).

A glass lens element having two positioning reference surfaces similar to that shown in FIGS. 5(A) and 5(B) was obtained.

A total of ten glass lens elements including the one mentioned above were formed by repeating the steps of glass dropping, pressing and lens taking out while maintaining constant the control temperatures (target set temperatures) of the upper and the lower molds and the outer shape restricting member, and no fracture or chip was caused in these lens elements.

As described above, according to the present embodiment, an optical element manufacturing method can be provided capable of manufacturing an optical element having a positioning reference surface on its rim at low cost and with high productivity and of handling size reduction of optical elements.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. An optical element manufacturing method, comprising:
    a preparation step of preparing a lower mold having a lower mold surface for forming an optical function surface of an optical element to be manufactured, an upper mold having an upper mold surface for forming another optical function surface of the optical element and an outer shape restricting surface for the optical element, said upper mold being opposed to the lower mold;
    a reference surface formation step of forming a positioning reference surface on a rim of the optical element by heating the outer shape restricting surface and the lower mold surface and dropping molten glass onto the lower mold surface so as to collide with the lower mold surface and spread to be in contact with the outer shape restricting surface;
    a pressing step of forming the two opposed optical function surfaces of the optical element by, after the formation of the reference surface, opposing the lower mold and the upper mold that is heated and bringing them relatively close to each other while the glass is still at a temperature at which it is deformable by pressing, and pressing the glass; and
    an element taking out step of, after the pressing step, releasing the glass from the pressing by the upper and the lower molds and taking out the molded optical element,
    wherein a temperature of the outer shape restricting surface in the reference surface formation step and the pressing step is higher than a temperature which is a difference when 100° C. is subtracted from a glass transition temperature (° C.) of the glass,
    wherein the reference surface formation step, the pressing step, and the element taking out step are performed while temperatures of the outer shape restricting surface, the lower mold surface and the upper mold surface are maintained at constant target temperatures, and
    wherein the constant target temperatures of the outer shape restricting surface, the lower mold surface and the upper mold surface are lower than that of the dropping molten glass.

2. An optical element manufacturing method as claimed in claim 1, wherein the lower mold has a restricting surface forming a second positioning reference surface of the optical element in a region of the lower mold surface outside of an effective diameter surface.

3. An optical element manufacturing method as claimed in claim 2, wherein in the reference surface formation step, the second positioning reference surface is formed simultaneously with the formation of the positioning reference surface on the rim of the optical element.

4. An optical element manufacturing method as claimed in claim 1, wherein all of the steps are performed while target set temperatures in temperature control for heating the outer shape restricting surface, the lower mold surface and the upper mold surface are maintained constant.

5. An optical element manufacturing method as claimed in claim 1, wherein the method is a method of manufacturing an optical element in which a cross section, perpendicular to an optical axis of the optical element, of the positioning reference surface on the rim of the optical element is non-circular, and the outer shape restricting surface is a surface where the positioning reference surface is formed.

6. An optical element manufacturing method as claimed in claim 1, wherein in the reference surface formation step, in dropping the molten glass, a drop amount adjustment member having a thin through hole formed therein is disposed on a dropping path, and the glass is dropped so as to collide with the drop amount adjustment member so that at least part of the dropped glass is pushed out of the thin hole as a minute drop and drops onto the lower mold surface.

7. An optical element manufacturing method as claimed in claim 1, wherein the temperature of the lower mold in the reference surface formation step and the pressing step is in range of (the glass transition temperature −50° C.) to (glass transition temperature +100°C.).

8. An optical element manufacturing method as claimed in claim 1, wherein the temperature of the upper mold in the reference surface formation step and the pressing step is in range of (the glass transition temperature −50° C.) to (glass transition temperature +100° C.).

* * * * *